Feb. 13, 1923.
T. MIDGLEY
VULCANIZING APPARATUS
Filed Apr. 2, 1921
1,445,533
3 sheets-sheet 1
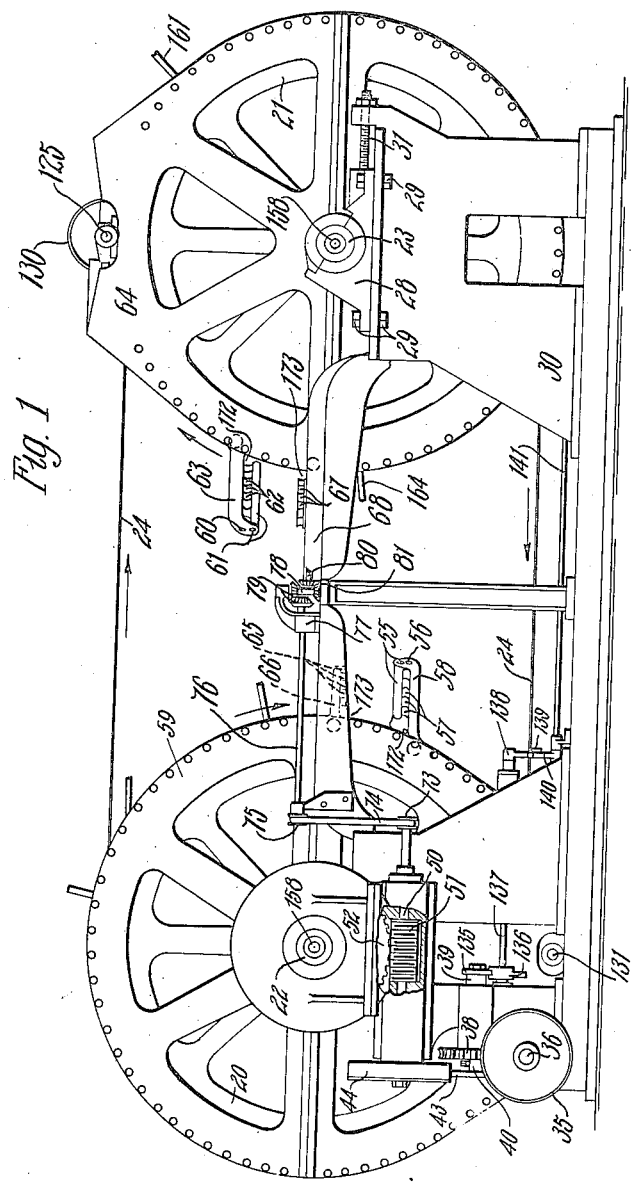
INVENTOR
Thomas Midgley
BY
ATTORNEY Feb. 13, 1923.
T. MIDGLEY
1,445,533
VULCANIZING APPARATUS
Filed Apr. 2, 1921
3 sheets-sheet 2
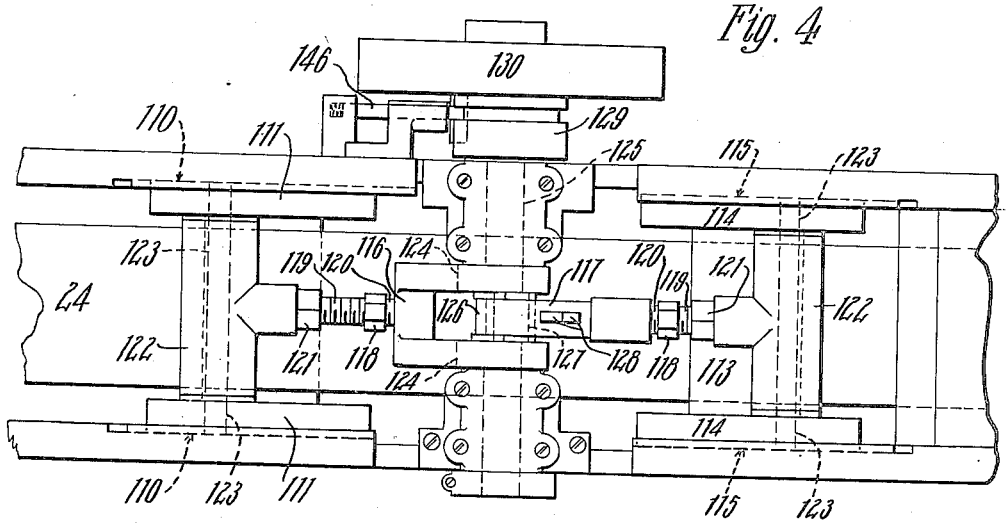
Fig. 4
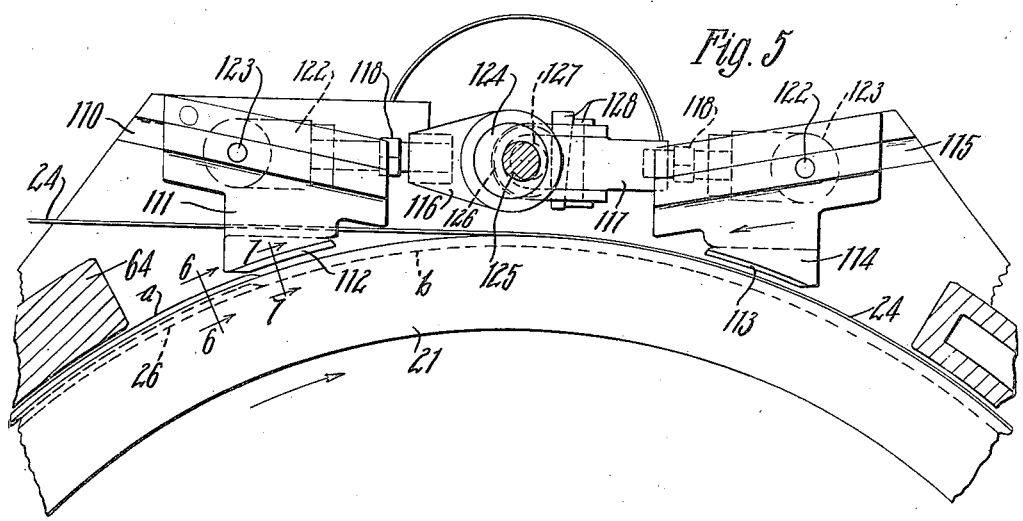
Fig. 5
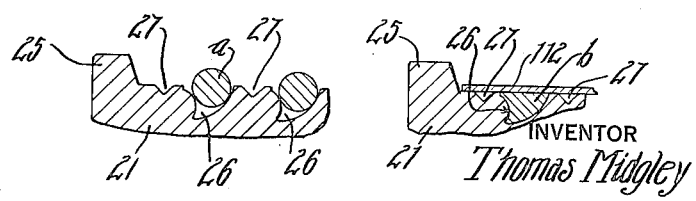
Fig. 6
Fig. 7
INVENTOR
Thomas Midgley
BY
Edward C. Taylor
ATTORNEY

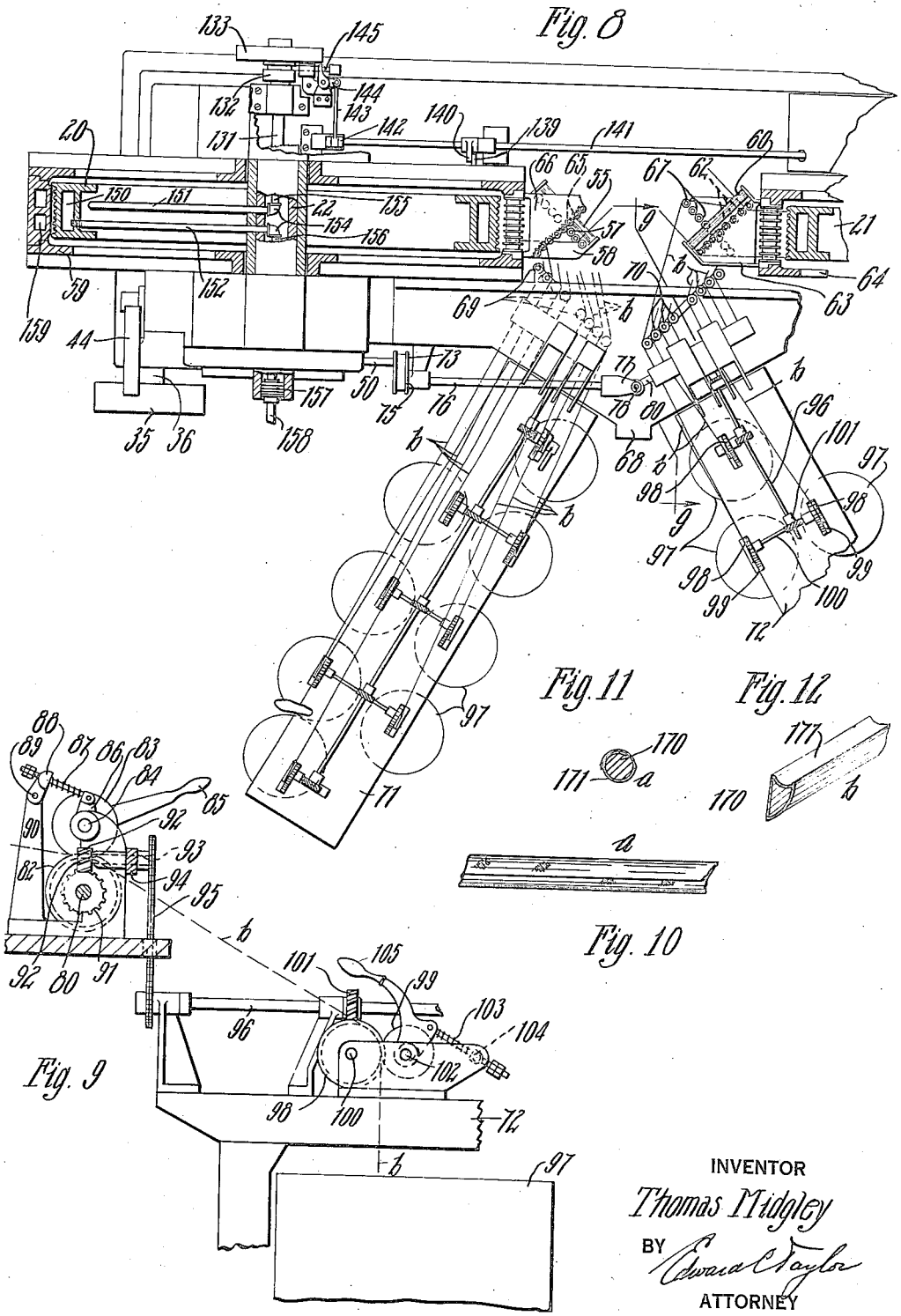

Patented Feb. 13, 1923.

1,445,533

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

VULCANIZING APPARATUS.

Application filed April 2, 1921. Serial No. 457,987.

*To all whom it may concern:*

Be it known that I, THOMAS MIDGLEY, a citizen of the United States of America, residing at Hampden, in the county of Hampden and State of Massachusetts, have invented certain new and useful Improvements in a Vulcanizing Apparatus, of which the following is a specification.

My present invention relates to apparatus for vulcanizing rubber articles, and is particularly designed for shaping and curing the clincher bead fillers used in the construction of tire casings.

A clincher bead filler as known in the art is a partially vulcanized rubber core, usually covered with bias-cut fabric shaped generally in the form of the bead portion of a clincher tire, and used as a filler or insert between the bead edges of the fabric or cord plies of which the carcass portion of a clincher tire casing is constructed. Such fillers have previously received their partial vulcanization in either straight or circular molds held together in a press the platens of which are heated as by steam jackets. By this method only short lengths of the beads could be cured at a time. It is the object of my invention to provide an apparatus by which long lengths of the beads can be cured as a continuous operation, and which will greatly increase production, reduce the labor incident to their manufacture, and reduce waste by enabling beads to be severed from the long lengths to the exact size desired without leaving the short pieces of scrap inevitable when beads are cured in the previously proposed methods. Other objects of my invention will appear from the description and claims.

My invention will now be described in connection with the accompanying drawings, in which:

Fig. 1 is a side elevation of the machine;

Fig. 2 is a detail of a portion of the operating mechanism;

Fig. 3 is a diagram of the heating connections;

Fig. 4 is a plan view of a pressing apparatus for seating the bead filler in the forming grooves;

Fig. 5 is a side elevation of the mechanism shown in Fig. 4, with portions of the frame removed;

Fig. 6 is a partial section showing the bead filler before the operation of the pressing apparatus, taken on line 6—6 of Fig. 5;

Fig. 7 is a partial section on line 7—7 of Fig. 5 but showing the presser-foot in operative position;

Fig. 8 is a fragmentary plan view of the vulcanizing apparatus, partly in section, showing also the devices for delivering the vulcanized beads to suitable receptacles;

Fig. 9 is a view of a part of the delivery apparatus on line 9—9 of Fig. 8;

Fig. 10 is a view of a bead filler prior to being formed and vulcanized;

Fig. 11 is a section of the same; and

Fig. 12 is a perspective view of a formed bead filler.

The machine comprises drums 20 and 21 supported upon hollow shafts 22 and 23, and over the peripheries of which runs a flexible band or belt 24, preferably constructed of steel or other suitable metal. The drums have on each side flanges 25 (see Figs. 6 and 7) to guide the belt, and are provided on their peripheries with molding grooves 26 into which the unformed bead fillers *a* are forced as will be described and are pressed by the belt 24 during vulcanization. Preferably overflow grooves 27 are arranged adjacent the molding grooves to permit of the extrusion of surplus material from the molding grooves. In order to keep the belt under suitable tension so as to apply a molding pressure, one of the shafts 22 or 23, 23 as shown, is mounted in journals 28 adjustably secured by bolts 29 in a pedestal 30, adjustment to tighten or loosen the belt being secured by a screw and nut indicated by 31 serving to move drum 21 toward or away from drum 20. By tightening the nut on the screw the former will bear against the portion of pedestal 30 through which the screw passes, the screw being thus caused to draw the journal 28 to the right as viewed in Fig. 1, resulting in a tightening of the belt. To loosen the belt the nut is backed off on the screw, permitting the journal to be moved to the left by the tension of the belt. Associated with these primary elements are groups of mechanisms which will now be described in their order. These groups comprise the driving mechanism for the drums, the devices for supplying to and delivering from the drums the lengths or ropes of bead fillers, the mechanism for pressing the unformed bead fillers into the molding grooves prior to the coming of the latter under the influence of the belt, and the arrangement for supplying heat to the fillers to be vulcanized.

Power for driving the drums is supplied, as through a pulley 35, to a shaft 36 upon which is fixed a worm 37 meshing with a worm wheel 38 on a shaft 39. Upon shaft 39 are fixed radial guide ways 40 in which slide a crank-pin 41, the position of which relative to shaft 39 may be fixed by an adjustment screw 42. Adjustment of the position of the crank pin serves to vary the stroke of the ratchet mechanism to be described, and consequently the rotative speed of the curing drums. The faster the speed with which the drums are rotated, the less will be the time during which the material is in contact with the drums. The degree of vulcanization can therefore be easily controlled independently of the heat supplied to the drums, a very useful feature in accommodating different rubber compounds. A pitman 43 connects the crank pin 41 with a pawl-carrier 44, which has opposed housings 45 and 46 each carrying a pair of pawls 47 pressed by springs 48 into contact with a ratchet 49. Each pair of pawls is set so that when one pawl of the pair is in mesh with a tooth of the ratchet the other will lie midway between two teeth and hence will be inactive. The purpose of this construction is to permit adjustment of the rotation of the ratchet to be more accurately controlled. By providing two pawls spaced as described the effect is the same as if the ratchet were provided with double the number of teeth, whereas a much more rigid construction is permitted. In order to balance the strains on the ratchet wheel, and to relieve the force acting on any one tooth diametrically opposite pawls preferably operate together. Pawl carrier 44 is rotatably mounted on a shaft 50 upon which is fixed the ratchet 49. This shaft carries a worm 51 meshing with a worm wheel 52 on shaft 22 of drum 20. By the mechanism described drum 20 is intermittently rotated by amounts which may be varied by adjusting screw 42. Drum 21 is driven from drum 20 by the belt 24, although obviously they could also be connected by other means if desired.

The uncured bead filler material in the form of long ropes or strips is directed into the molding grooves 26 of drum 20 by horizontal rollers 55, 56 and vertical rollers 57, all being journaled in a bracket 58 mounted on a casing 59 surrounding drum 20 for a purpose to be described. Material is similarly directed into the molding grooves of drum 21 by horizontal rollers 60, 61 and vertical rollers 62 journaled in a bracket 63 mounted on a casing 64 surrounding drum 21. These guiding rollers are preferably angularly mounted so that they may receive the lengths of bead filler material from one side of the machine (as shown, that side at the top of Fig. 8). The cured lengths of bead fillers are guided from drum 20 by vertical rollers 65 journaled in a bracket 66 mounted on casing 59, and from drum 21 by vertical rollers 67 journaled in a bracket 68. After passing these rollers the two sets of fillers pass between series of rollers 69 and 70 respectively, these rollers being journaled in bracket 68. The delivery apparatus which receives the cured bead fillers from these guiding rollers is arranged in two sets, mounted on frames 71 and 72 respectively. As these are similar in character a description of one will suffice.

On the end of intermittently rotated shaft 50 is a pulley 73 connected by a belt 74 with a pulley 75 on a shaft 76. At its other end this shaft passes through a bearing bracket 77 and drives a vertical shaft 78 through bevel gears 79. A shaft 80 is driven from shaft 78 through bevel gears 81. This shaft 80 drives the delivery mechanism mounted on frame 72 as will be described. A similar shaft driven by bevel gears (not shown) on the lower portion of shaft 78 drives the delivery mechanism on frame 71. Mounted on shaft 80 for rotation therewith are delivery rolls 82, suitably shaped to conform to the shape of the bead fillers. Cooperating with each delivery roll is a roll 83 eccentrically journaled on a shaft 84 which may be rocked by a handle 85. An arm 86 projecting from the shaft 84 has pivoted thereto a rod 87 passing through a guide 88 pivoted at 89 to a bracket 90. A spring on rod 87 presses the arm 86 away from guide 88. The purpose of this construction is to provide a toggle action which, when the parts are in the position shown, will press roll 83 yieldingly against roll 82; and when the handle 85 is moved upwardly to disengage rolls 82 and 83, will hold the parts in the disengaged position.

Also mounted on shaft 80 is a spiral gear 91 meshing with a spiral gear 92 on a shaft 93 journaled in a bracket 94. By means of a chain and sprocket connection 95 shaft 93 drives a shaft 96 extending lengthwise of frame 72 and serving to drive individual delivery units which deliver the cured bead fillers $b$ to containers 97. The bead fillers pass from rolls 82, 83 to rolls 98, 99 suitably shaped to conform to the bead filler. Roll 98 of each set is fixed on a shaft 100 driven by spiral gears 101 from shaft 96. Roll 99 is eccentrically mounted on a shaft 102 and is connected by a spring pressed arm 103 to a guide 104 so as to give a toggle control for its handle 105 substantially as described with reference to rolls 83 above. By this mechanism the several continuous lengths of cured bead filler $b$ are guided and delivered from the curing drums.

As the ropes of uncured bead fillers are directed into the molding grooves it is desirable to press them firmly into place before they come under the belt 24. This is for the reason that if the material is fed directly into the bight of the belt and the drum there will be a drawing down of the cross-section of the filler at this point, with a consequent liability of undersized and imperfect fillers. If, however, the bead fillers are pressed home into the molding grooves before they contact with the belt they will be caused to completely fill the grooves without the drawing tendency. To press the fillers into the molding grooves I provide at the point of entrance of the bead fillers between the belt and each drum a mechanism which will now be described. The pressure mechanism in the case of drum 20 is at the bottom and in the case of drum 21 at the top. As the construction of each is the same a description of the pressure mechanism associated with drum 21 will be given, and will suffice for both except in the particulars noted below.

Secured to casing 64 are guide-ways 110 in which runs a carriage 111 supporting a presser-foot 112 shaped to conform to the circumference of the drum (Figs. 5 and 7). In Fig. 7 this presser-foot is shown in its operative position, and in Fig. 5 just after it has been withdrawn from this position. In order to prevent any tendency of presser-foot 112 to cause rotation of the drum or to create unbalanced conditions a dummy presser-foot 113, acting on the outside of belt 24, is preferably provided on a carriage 114 running in guide-ways 115 supported by casing 64 and inclined oppositely to guide-ways 110 as shown in Fig. 5. The oppositely disposed presser-feet are operated simultaneously by connecting rods 116 and 117 coupled to carriages 111 and 114 respectively by screws having intermediate nuts 118 and right and left hand portions 119 and 120 whereby the positions of the presser-feet relative to their connecting rods may be separately adjusted. Nuts 121 serve to clamp the screws in adjusted position upon swivels 122 pivoted at 123 to the carriages. Connecting rod 116 is formed as a yoke embracing eccentrics 124 fixed on a shaft 125. Connecting rod 117 has a strap portion 126 which encircles an eccentric 127 on shaft 125 and is held in position on the connecting rod by adjusting wedges 128. Shaft 125 is fixed to the secondary element 129 of a one-revoultion clutch of any suitable design, the primary or power side of which is attached to a pulley 130 which may be driven from any suitable source of power. The presser-feet acting upon the lower side of drum 20 are not shown on the drawings, but may be made similar to the presser-feet associated with drum 21, and are operated by a shaft 131 to which is secured the secondary element 132 of a one-revolution clutch. The primary element of this clutch is driven by a pulley 133 from any suitable source of power. It will be understood from the foregoing that the presser foot 112 which acts upon the material to force it into the molding grooves is located between the band 24 and the surface of the drum; whereas the dummy foot 113 acts on the outside of the band. This is clearly shown in Fig. 5. In the case of foot 112 the band passes between the side members of the carriage 111, as indicated in Fig. 5.

Instead of driving the presser mechanisms from separate sources of power controlled by one revolution clutches they may be, if desired, geared directly to the power shaft 36 in such a manner as to operate during the periods of rest of the intermittently rotated drums. The construction embodying separate drives with clutches has, however, advantages in not subjecting the main drive to the variable load of the pressers, and of permitting the pressers to be driven by a belt drive which is flexible as compared to a geared drive while keeping the pressers in timed relation with the drums. The manner in which the pressers might be geared directly to the main power shaft will be obvious to any skilled mechanic, and I will therefore describe merely that form of mechanism in which separate drives are employed.

The clutches for the two sets of presser-feet are controlled by a cam 135 mounted on shaft 39, acting at every revolution of the shaft to trip an arm 136 secured on a rock shaft 137. This cam is timed so that the tripping occurs just after the movement of the drums by pawls 47, so that the resulting movement of the presser-feet will occur during the period of rest of the drums. Shaft 137 is provided with a crank 138 connected by a link 139 with an arm 140 on a second rock shaft 141 on the opposite side of the machine. Rock shaft 141 is provided with an arm 142 connected by a link 143 with a bell crank 144 which operates the trip slide 145 of the one revolution clutch. This type of clutch in many modifications is well known, particularly in the art of driving punch presses, and need not be described in detail here. It will suffice to say that it acts to rotate the shaft 131 through one revolution, thereby causing the presser-feet to pass through one complete cycle, and then to stop until the trip slide is again actuated. The trip slide 146 which actuates the one-revolution clutch associated with shaft 125 is similarly operated by linkage from shaft 141, although the details of its connection therewith have not been illustrated.

The arrangement of elements whereby heat is supplied to the fillers to vulcanize them will now be described. This heat is derived from two sources, the drums and the casings 59 and 64 surrounding the drums. The drums are provided with annular chambers 150 through which steam is circulated by pipes 151 and 152, chambers 150 being divided between the pipes by a partition 153 so that the steam will be forced to circulate through the entire chamber. Pipes 151 and 152 are joined by elbows 154 with pipes 155 and 156 running axially through the hollow interior of shafts 22 and 23 and connected, as by swiveled stuffing boxes 157, with pipes 158 leading to any suitable source of steam supply. Casings 59 and 64 are provided with chambered portions 159 having inlet and outlet pipes 160 and 161 and with chambered portions 162 having inlet and outlet pipes 163 and 164. The chambers 159 extend substantially around that portion of the drum covered by the belt, while the chambers 162 provide an additional heating space after the bead fillers have left the belt, in order to increase the speed with which the fillers may be cured. It is not necessary to have pressure exerted during the entire vulcanizing operation provided it is maintained for a sufficient time to impart a molded form to the beads, and by continuing the heating beyond the semi-circumference covered by the belt the speed of the drums may be increased while attaining the same degree of vulcanization.

The manner of operating this vulcanizing apparatus will now be described. The unvulcanized bead fillers are supplied in any desired lengths in the form of round or partially shaped ropes of rubber 170 usually provided with a fabric covering 171. These ropes are directed by guide rolls 57 and 62 into place on the molding grooves 26 (Fig. 6) at about the point 172 in Figs. 1 and 3. From this point the ropes are carried by the intermittent rotation of the drums into the range of action of the presser-feet. These force the rope into the molding grooves, causing them to fill the latter as shown in Fig. 7 and getting them into position to pass under belt 24 without danger of the drawing action mentioned above. The formed material, heated both by the steam circulated through the drums and the steam in the chambers 159, is kept under a forming pressure by the belt during a half revolution of the drum. After this period of pressure the formed bead fillers $b$ have acquired their molded form, even though they may not have reached the desired vulcanization. Vulcanization is preferably continued by heat supplied jointly by the drums and chambers 162 after the bead fillers have left the influence of the belt. At substantially points 173 (Figs. 1 and 3) the formed bead fillers are guided away from the drums and are directed by the delivery apparatus to the receptacles 97. The speed of the drums, and consequently the time of vulcanization, may be varied by adjusting the screw 42; and therefore under a standard steam pressure and temperature, the degree of vulcanization to be given to the bead fillers may be controlled. If desired, suitable stripping guides may be installed to assist in stripping the cured bead fillers from the molding grooves, and scrapers may be used for keeping the belt and the molding grooves clean; but these, as well as other modifications which will suggest themselves, I have not shown.

It will be clear from the foregoing description that the apparatus chosen for purposes of illustration will accomplish the specific object of vulcanizing continuous lengths of bead filling material in an efficient manner. The apparatus in addition discloses certain improved features of importance in the continuous vulcanization of rubber articles under molding pressure. For example, to increase the capacity of the apparatus I show a series of circular molds, some located as a pulley in one turn of a pressure belt and others located as a pulley in the other turn of the same belt. By this arrangement the circumference of the molds may be small enough and the width of the belt small enough to give a good belt pressure around all of them for closing the molds. The belt as stated is preferably of steel, and is heated by one drum before it returns to the other drum. This coordination of the apparatus enables me to improve the vulcanizing conditions in continuous operation as compared to putting the same molding capacity all on one drum of either greater width or greater circumference.

Having thus described my invention, I claim:

1. An apparatus of the class described comprising a drum having a plurality of annular molding grooves in its periphery and annular overflow cavities disposed between said molding grooves, and a flexible endless band tightly encircling a portion of the periphery of the drum and adapted to force material to be molded into said molding grooves.

2. A vulcanizing apparatus comprising a drum, a flexible band tightly encircling a portion of the drum, means for heating material pressed between the drum and the band, a shaft adapted to be driven at a substantially uniform speed, and adjusting and connecting means interposed between the shaft and the drum whereby the speed of rotation of the drum may be varied to vary the time of vulcanization.

3. A vulcanizing apparatus comprising a drum, a flexible band encircling a portion of the drum and adapted to rotate therewith, means for heating material pressed between the drum and the band, a shaft adapted to be driven at a substantially uniform speed, a crank driven thereby, means for adjusting the throw of the crank, and pawl and ratchet mechanism driven by the crank and constructed and arranged to cause intermittent rotation of the drum, whereby the time of vulcanization may be varied.

4. An apparatus of the class described comprising a drum provided with annular molding grooves, a flexible band encircling a portion of the periphery of the drum and adapted to rotate therewith, and means for forcing material into the molding grooves before such material is brought under the band by the rotation of the drum.

5. An apparatus of the class described comprising a drum provided with annular molding grooves, a flexible band encircling a portion of the periphery of the drum and adapted to rotate therewith, means for causing intermittent rotation of the drum, and a reciprocating presser-foot constructed and arranged to force material during the periods of rest of the drum into the molding grooves before such material is brought under the band by the rotation of the drum.

6. An apparatus of the class described comprising a drum provided with annular molding grooves, a flexible band encircling a portion of the periphery of the drum and adapted to rotate therewith, means for causing intermittent rotation of the drum, a reciprocating presser-foot angularly disposed with relation to the surface of the drum and constructed and arranged to force material during the period of rest of the drum into the molding grooves before such material is brought under the band by the rotation of the drum, and a dummy presser-foot disposed at an angle opposite to that of the first named presser-foot and constructed and arranged to act upon the drum simultaneously therewith.

7. An apparatus of the class described comprising a drum, a flexible band encircling a portion of the periphery of the drum, means for heating the drum, a casing surrounding the drum adjacent the region of contact of the band with the drum and provided with means whereby it may be heated, and a second casing provided with means whereby it may be heated and surrounding a portion of the periphery of the drum not covered by the band.

8. An apparatus of the class described comprising a drum provided with annular molding grooves, a flexible band encircling a portion of the periphery of the drum and adapted to rotate therewith, means for guiding material to said grooves, and means separate from the drum for drawing material away from said grooves.

9. In a machine of the character described, pressure molding means for plastic material, mechanism to partially mold said material, and devices operable to cause said mechanism to act on said material and feed it to said means in partially molded form.

10. An apparatus of the class described comprising a pair of drums each provided with a plurality of annular molding grooves, a flexible band encircling both drums and a plurality of delivery devices constructed and arranged to deliver the material from the several grooves of each drum into separate receptacles.

11. An apparatus of the class described, comprising two spaced drums each provided with a plurality of annular molding grooves, a flexible band encircling both drums and closing the molding grooves throughout a portion of the periphery of the drums and angularly disposed guides for directing the material away from the grooves in a direction to one side of the plane of the drums.

12. An apparatus of the class described comprising two spaced drums each provided with a plurality of annular molding grooves in its periphery, a flexible band encircling both drums and closing the molding grooves throughout a portion of the periphery of the drums, two delivery units leading from the space between the drums in diverging relation, each unit comprising a plurality of spaced delivery devices constructed and arranged to lead away the material from the several grooves of the drums, and means for driving said delivery devices.

13. A vulcanizing apparatus comprising in combination a heating drum, a metal belt tensioned about a portion of said drum to press the material against the drum during vulcanization, means to rotate the drum and move the belt to and from its pressure contact, and means to heat the belt after it has left said drum and before it returns to said drum.

14. A vulcanizing apparatus comprising in combination two heating drums, a metal belt tensioned about said drums, at least one of said drums being adapted to vulcanize a continuous length of rubber material between its surface and said belt, and each of said drums being adapted to heat said belt for more effective action with the vulcanizing drum.

15. A vulcanizing apparatus comprising in combination two heating drums and a metal belt tensioned to travel in pressure contact against both drums, said drums being spaced apart sufficiently for feeding rubber material between the belt and each drum, guides between the drums for the rubber material as it enters and leaves the drums, all constructed and arranged for said heating drums to continuously vulcanize indefinite lengths of rubber material under the pressure of the belt while the latter is heated by both drums.

16. A vulcanizing apparatus comprising in combination two heating drums of substantially equal diameters, a belt looped over said drums, undercut molding surfaces on the face of each drum, and means to tension said belt against both the drums whereby rubber material fed towards the molding surfaces will be forced towards the undercut portions by the bight of the belt during its turning movement about both drums.

17. A vulcanizing apparatus comprising in combination a series of open faced circular molds, means to heat said molds, an endless belt for closing said molds, some of said molds located at one turn of the belt and others located at the opposite turn of the belt, means to rotate the belt and molds together for feeding material to and from the molds, and a device for tensioning the belt against the molds whereby the pressure conditions for a given belt and mold capacity are improved.

18. A rubber vulcanizing apparatus comprising a series of individual molds each open throughout a complete circumference, means to heat said molds, one endless belt for closing all of said molds over a part of their openings, some of said molds located as a pulley at one turn of the belt and others located as a pulley at the opposite turn of the belt, means to rotate the belt and molds together, means to increase the pressure of the belt against material presented to the belt at the openings of the molds around both turns of the belt, all constructed and arranged to increase the capacity and pressure of the apparatus for vulcanizing.

THOMAS MIDGLEY.